United States Patent
de Ruijter et al.

(10) Patent No.: US 8,634,502 B2
(45) Date of Patent: Jan. 21, 2014

(54) RECEIVER WITH ASYNCHRONOUS AND SYNCHRONOUS DEMODULATOR

(75) Inventors: Hendricus de Ruijter, Sunnyvale, CA (US); Wentao Li, Mountain House, CA (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 13/595,949

(22) Filed: Aug. 27, 2012

(65) Prior Publication Data

US 2013/0083869 A1    Apr. 4, 2013

Related U.S. Application Data

(60) Provisional application No. 61/542,143, filed on Sep. 30, 2011.

(51) Int. Cl.
*H03K 9/00*    (2006.01)
*H04L 27/00*   (2006.01)

(52) U.S. Cl.
USPC ............ 375/316; 375/324; 375/340; 375/354

(58) Field of Classification Search
USPC .................. 375/316, 324, 340, 354
See application file for complete search history.

(56) References Cited

U.S. PATENT DOCUMENTS

| | | | | |
|---|---|---|---|---|
| 7,313,085 | B2 * | 12/2007 | Kim | 370/208 |
| 2003/0072256 | A1 * | 4/2003 | Kim | 370/208 |
| 2003/0152172 | A1 * | 8/2003 | Kim | 375/346 |
| 2007/0100610 | A1 * | 5/2007 | Disch et al. | 704/212 |

* cited by examiner

*Primary Examiner* — Ted Wang
(74) *Attorney, Agent, or Firm* — Cesari & Reed LLP; R. Michael Reed

(57) ABSTRACT

A receiver circuit includes an asynchronous demodulator having a demodulator input to receive a first signal and a demodulator output configured to provide a demodulated signal. The receiver circuit further includes a circuit, a multiplexer, and a synchronous demodulator. The modulator circuit includes a modulator input coupled to the demodulator output and includes a modulator output. The modulator re-modulates the demodulated signal to produce a second signal and provides the second signal to the modulator output. The multiplexer includes a first input to receive the first signal, a second input coupled to the modulator output to receive the second signal, a control input to a receive a select signal, and a multiplexer output. The synchronous demodulator includes an input coupled to the multiplexer output and an output to provide a demodulated output signal corresponding to a selected one of the first signal and the second signal.

20 Claims, 2 Drawing Sheets

RECEIVER WITH ASYNCHRONOUS AND SYNCHRONOUS DEMODULATOR

CROSS-REFERENCE TO RELATED APPLICATION(S)

This application is a non-provisional patent application of and claims priority to U.S. Provisional Patent Application No. 61/542,143 filed on Sep. 30, 2011 and entitled "Receiver with Asynchronous and Synchronous Demodulator", which is incorporated herein by reference in its entirety.

FIELD

The present disclosure is generally related to receivers for receiving wireless signals.

BACKGROUND

Radio frequency (RF) signals transmitted over unlicensed bands may utilize a variety of modulation types. For example, frequency shift keying (FSK) signals utilize a relatively small modulation index (such as H<1) for which a synchronous receiver may provide suitable sensitivity, while FSK signals with higher modulation indices may be more sensitively received using an asynchronous demodulator. However, asynchronous demodulators sometimes produce glitches that cause the output signal to oscillate. Such asynchronous demodulators often include or are coupled with a deglitching circuit to eliminate such glitches.

SUMMARY

In an embodiment, a receiver circuit includes an asynchronous demodulator having a demodulator input configured to receive a first signal and a demodulator output configured to provide a demodulated signal. The receiver circuit further includes a modulator circuit, a multiplexer, and a synchronous demodulator. The modulator circuit includes a modulator input coupled to the demodulator output and includes a modulator output. The modulator is configured to re-modulate the demodulated signal to produce a second signal and to provide the second signal to the modulator output. The multiplexer includes a first input configured to receive the first signal, a second input coupled to the modulator output to receive the second signal, a control input to a receive a select signal, and a multiplexer output. The synchronous demodulator includes an input coupled to the multiplexer output and an output configured to provide a demodulated output signal corresponding to a selected one of the first signal and the second signal.

In another embodiment, a method includes receiving a phase modulated signal at a first terminal and an amplitude modulated signal at a second terminal of a receiver circuit. The method further includes demodulating the phase modulated signal using an asynchronous demodulator to produce a demodulated signal and re-modulating the demodulated signal to produce a second signal. The method further includes providing a selected one of the phase modulated signal and the second signal to an output of a multiplexer and demodulating the one of the phase modulated signal and the second signal using a synchronous demodulator coupled to the output of the multiplexer.

In yet another embodiment, a receiver circuit includes an asynchronous demodulator having a demodulator input configured to receive an input signal and having a demodulator output configured to provide a demodulated signal. The receiver circuit further includes a modulator having a modulator input coupled to the demodulator output and a modulator output configured to provide a second signal. The receiver circuit also includes a multiplexer having a first input configured to receive the input signal, a second input coupled to the modulator output, a control input, and a multiplexer output. Additionally, the receiver circuit includes a synchronous demodulator having an input coupled to the multiplexer output and an output configured to provide an output signal.

BRIEF DESCRIPTION OF THE DRAWINGS

In the following description, the use of the same reference numerals in different drawings indicates similar or identical items.

DETAILED DESCRIPTION OF ILLUSTRATIVE EMBODIMENTS

In an asynchronous demodulator, a comparator is used to compare the raw demodulated signal to an estimate of the modulation center. Due to noise at its input, the output of the asynchronous demodulator (the output of the comparator) is prone to have glitches. Deglitch circuitry to eliminate such glitches often includes a phase locked loop (PLL) circuit in combination with a synchronization stage. The phase locked loop (PLL) circuit locks onto the data rate of the received signal, locking the phase decision moments to the incoming bit stream, so the output of the synchronous demodulator is inherently glitch free.

Embodiments of a receiver circuit are described below that utilize a synchronous demodulation as a deglitching circuit, making the receiver capable of supporting both synchronous and asynchronous demodulation by re-using the synchronous demodulation to deglitch the asynchronous demodulator, reducing internal and external hardware and making the receiver more economical in terms of cost, complexity, and silicon footprint.

In an example, a receiver circuit includes an input for receiving a signal and includes an asynchronous modulator coupled to the input and having an output for providing a demodulated output signal. The receiver circuit further includes a modulator for re-modulating the demodulated output signal to produce a phase or frequency or amplitude modulated signal. The receiver circuit also includes a synchronous demodulator and a multiplexer including an input for receiving the input signal, an input for receiving the phase or frequency modulated signal, and an output coupled to an input of a synchronous demodulator. A controller controls the multiplexer to selectively provide one of the input signal and the phase or frequency or amplitude modulated signal to the synchronous modulator to produce the output signal.

Figure 1:
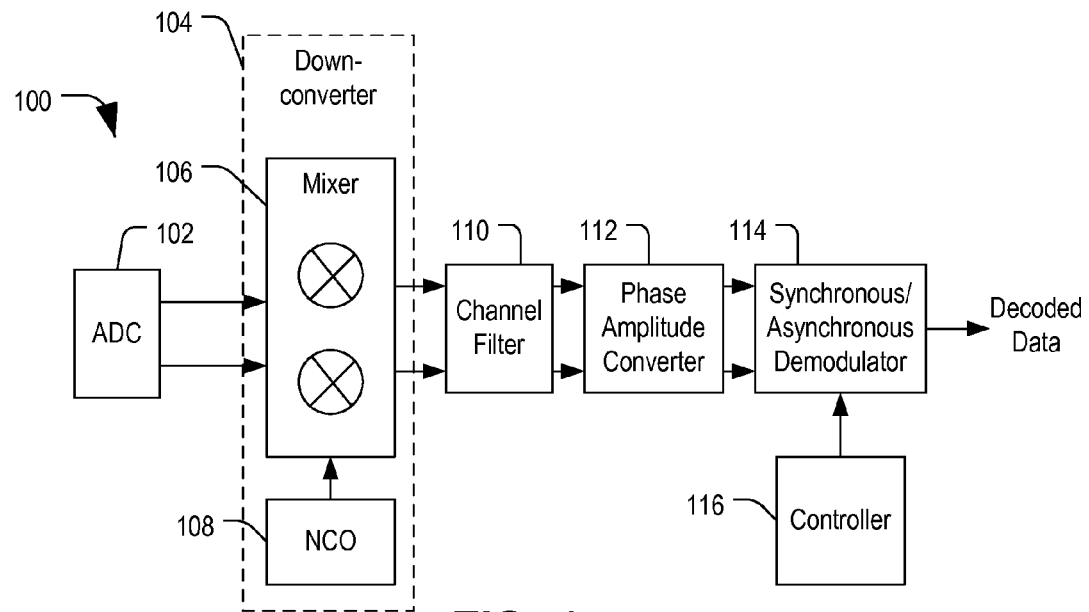
FIG. 1 is a block diagram of an embodiment of a receiver circuit including a demodulator for providing asynchronous and synchronous demodulation.

FIG. 1 is a block diagram of an embodiment of a receiver circuit 100 including a demodulator 114 for providing asynchronous and synchronous demodulation. Receiver circuit 100 includes an analog-to-digital converter (ADC) 102 for converting a complex analog signal (such as a received intermediate frequency (IF) signal) into a complex digital signal. ADC 102 includes a complex output (in-phase (I) and quadrature (Q)) coupled to an input of a complex down-converter 104 for converting the digital signal to a complex baseband signal. In the illustrated example, complex down-converter 104 includes a mixer 106 with an input coupled to an output of a numerically controlled oscillator (NCO) 108. In an alternative embodiment, a voltage controlled oscillator (VCO) may be used.

Complex down-converter mixes the digital input signal with the oscillator signal to produce a complex baseband signal (such as I and Q signals), which are provided to channel filter 110. Channel filter 110 includes two outputs for providing the filtered I and Q signals to a phase/Amplitude converter 112, which provides the phase and amplitude signals to synchronous/asynchronous demodulator 114. Synchronous/asynchronous demodulator 114 is responsive to control signals from controller 116 to select between the asynchronous demodulation mode and the synchronous demodulation mode to produce the decoded data.

In an embodiment, controller 116 determines a suitable receive mode based on the type of signal being received. If the controller 116 detects a signal with a small modulation index, controller 116 selects the synchronous demodulation mode. In contrast, controller 116 selects the asynchronous demodulation mode in response to a signal having a higher modulation index.

In an example, receiver 100 is an integrated, single chip wireless RF receiver configurable for asynchronous and/or synchronous demodulation of received RF signals over a wide range of frequency bands. In one embodiment, the range of frequency bands includes frequencies from about 240 to about 960 MHz. Other frequencies are also possible. Further, receiver 100 allows for substantially continuous frequency coverage in about 156 Hz or about 312 Hz steps, providing precise tuning control. Further, receiver 100 digitizes and down-converts the RF signal to a low intermediate frequency, at which it can be processed in the digital domain, allowing for filtering, demodulation, slicing, and packet handling to be performed by, for example, a digital signal processor (in some implementations).

Figure 2:
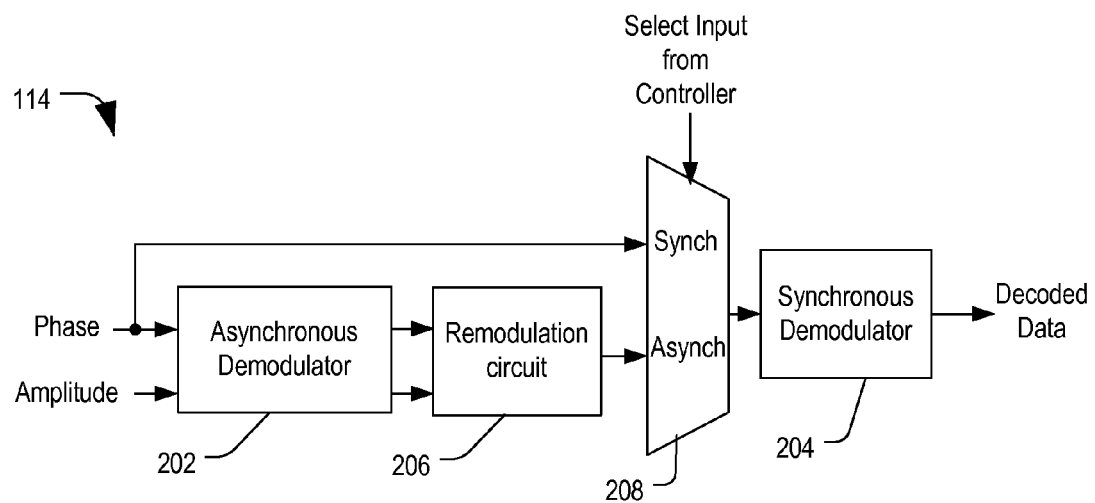
FIG. 2 is a block diagram of the demodulator of FIG. 1 including an asynchronous demodulator and a synchronous demodulator.

FIG. 2 is a block diagram of the demodulator 114 of FIG. 1 including an asynchronous demodulator 202 and a synchronous demodulator 204. The asynchronous demodulator 202 may include at least one input having an input for receiving a phase signal and/or an input for receiving an amplitude signal. The asynchronous demodulator compares the raw (unsliced) demodulated signal to an estimate of the modulation center, producing an asynchronously demodulated output signal that is prone to glitches. The asynchronous demodulator 202 further includes an output coupled to an input of a re-modulation circuit 206, which has an output. The modulator 206 re-modulates the asynchronously demodulated output signal to produce a second modulated signal (phase, frequency or amplitude) suitable for the synchronous demodulator 204. Demodulator 114 further includes a multiplexer 208 including an input for receiving the modulated signal (phase, frequency or amplitude modulated signal), an input for receiving the second modulated signal, a control input responsive to a select input from controller 116, and an output coupled to an input of synchronous demodulator 204.

In a first mode, controller 116 controls multiplexer 208 to provide the modulated input signal to the input of synchronous demodulator 204. In a second mode, controller 116 controls multiplexer 208 to provide the second modulated input signal to the input of synchronous demodulator 204, using the synchronous demodulator 204 to deglitch the output of asynchronous demodulator 202. Thus, rather than including a PLL circuit that would add complexity and consume precious circuit real estate, the synchronous demodulator 204 serves a dual purpose and is re-used as a deglitching circuit, reducing overall cost and complexity of receiver circuit 100.

Figure 3:
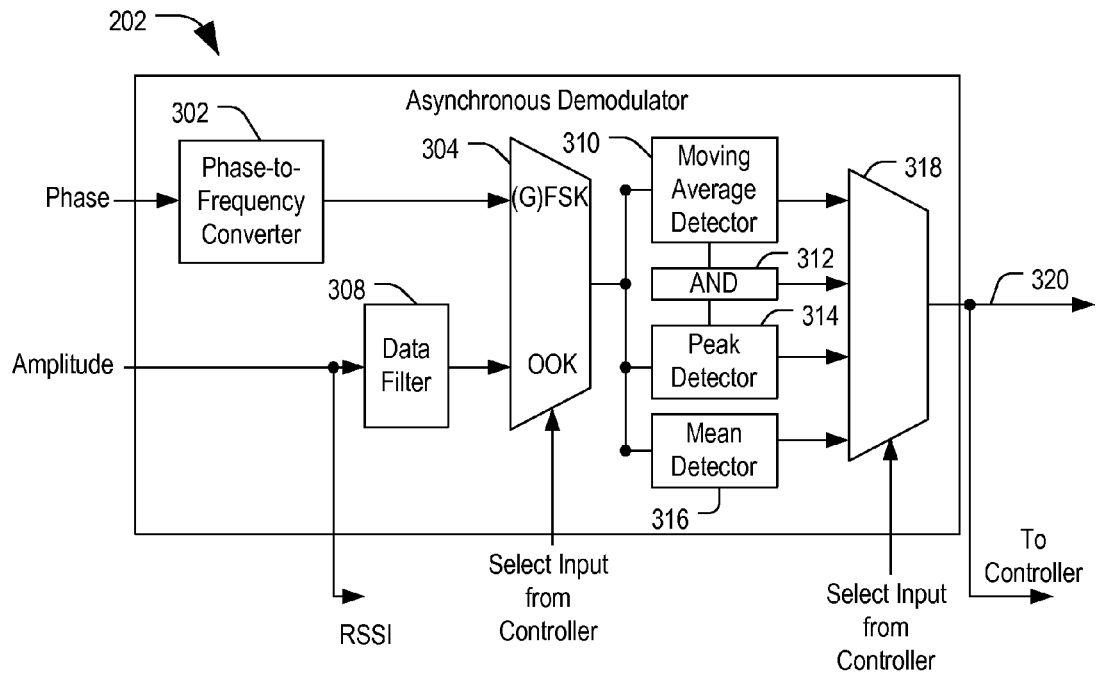
FIG. 3 is a block diagram of an embodiment of the asynchronous demodulator of FIG. 2.

FIG. 3 is a block diagram of an embodiment of the asynchronous demodulator 202 of FIG. 2. Asynchronous demodulator 202 includes a phase-to-frequency converter 302 including an input for receiving the phase modulated signal and including an output coupled to a first input of a multiplexer 304. Asynchronous demodulator 202 further includes an input for receiving the amplitude modulated signal that is coupled to an input of a data filter 308, which has an output coupled to a second input of multiplexer 304. In some instances, a received signal strength indicator (RSSI) circuit may be coupled to the input of data filter 308 to determine the RSSI for the amplitude modulated signal. In an example, controller 116 may utilize the RSSI data to determine the suitable mode for the receiver (e.g., synchronous mode or asynchronous mode). When the RSSI is low, it may be desirable to use an asynchronous mode for greater sensitivity. In contrast, when RSSI is high, it may be desirable to utilize the synchronous mode for enhanced reception.

Multiplexer 304 includes a control input responsive to control signals from controller 116 to select between the frequency input signal at the first input and the filtered amplitude modulated signals at the second input. Multiplexer 304 further includes an output for providing the selected signal. Selection of the first input corresponds to an asynchronous demodulation of a frequency shift keying type of signal, while selection of the second input corresponds to an asynchronous demodulation of an on-off keying (OOK) type of signal.

Asynchronous demodulator 202 further includes a plurality of detectors including a moving average detector 310, a peak detector 314, and a mean detector 316. Each of the detectors includes an input coupled to the output of the multiplexer 304 and an output coupled to respective input of multiplexer 318. Further, asynchronous demodulator 202 includes an AND gate 312 having a first input coupled to the moving average detector 310, a second input coupled to the peak detector 314, and an output coupled to an input of multiplexer 318. Multiplexer 318 further includes a control input responsive to the controller 116 and an output 320 for providing an asynchronously demodulated output signal, which can be provided to the controller 116 and which is provided as an input to re-modulation circuit 206, as discussed below with respect to FIG. 4.

Figure 4:
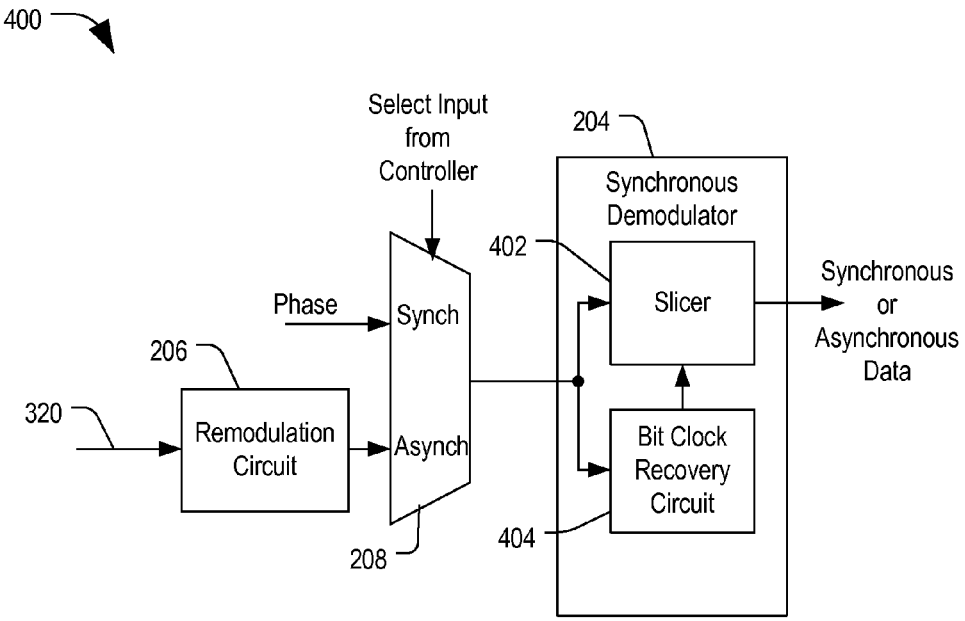
FIG. 4 is a block diagram of a portion of the demodulator of FIG. 2, including an expanded version of the synchronous demodulator.

FIG. 4 is a block diagram of a portion 400 of the demodulator 114 of FIG. 2, including an expanded version of the synchronous demodulator 204. The output 320 of asynchronous demodulator 202 is coupled to an input of re-modulation circuit 206, which has an output coupled to the second input of multiplexer 208. Multiplexer 208 includes a first input for receiving the phase modulated signal, a control input, and a multiplexer output coupled to synchronous demodulator 204. Synchronous demodulator 204 includes a slicer 402 and a bit clock recovery (BCR) circuit 404. Slicer 402 and BCR circuit 404 have inputs coupled to the multiplexer output. BCR circuit 404 has an output coupled to a control input of slicer 402 to control timing of the slice operation. Slicer 402 has an output for providing the demodulated data signal. In an example, slicer 402 may be implemented as a comparator including an input coupled to the output of the multiplexer, a second input coupled to the output of the BCR circuit 404, and an output for providing a signal corresponding to the result of the comparison. In this example, the BCR circuit 404 provides a reference signal for the comparator.

In conjunction with the circuits described above with respect to FIGS. 1-4, a receiver and integrated circuit are described that include a demodulator configured to provide both asynchronous and synchronous demodulation without using a PLL circuit to deglitch the asynchronously demodulated output. Instead, the synchronous demodulator operates both to demodulate the phase modulated signal in a synchronous mode and to deglitch the output of the asynchronous demodulator in an asynchronous mode.

While the above discussion identified one possible implementation of the receiver circuit, other implementations are also possible. In an example, modulator/demodulator may be implemented as a modem within a transceiver circuit having a digital signal processor or other data processing units, an RSSI block, a microcontroller unit (MCU) (or other type of processor circuitry), and/or other circuitry. Further, the operating mode of the synchronous/asynchronous demodulator 114 may be controlled by the MCU in connection with programmable software and/or firmware stored in a memory or other storage device (not shown).

Although the present invention has been described with reference to preferred embodiments, workers skilled in the art will recognize that changes may be made in form and detail without departing from the scope of the invention.

What is claimed is:

1. A receiver circuit comprising:
   an asynchronous demodulator including a demodulator input configured to receive a first signal and a demodulator output configured to provide a demodulated signal; and
   a modulator circuit including a modulator input coupled to the demodulator output and including a modulator output, the modulator configured to re-modulate the demodulated signal to produce a second signal and to provide the second signal to the modulator output;
   a multiplexer including a first input configured to receive the first signal, a second input coupled to the modulator output to receive the second signal, a control input to a receive a select signal, and a multiplexer output; and
   a synchronous demodulator including an input coupled to the multiplexer output and an output configured to provide a demodulated output signal corresponding to a selected one of the first signal and the second signal.

2. The receiver circuit of claim 1, further comprising a controller coupled to the control input of the multiplexer and configured to provide the select signal to control the multiplexer to selectively provide one of the first signal and the second signal to the multiplexer output.

3. The receiver of claim 1, wherein the synchronous demodulator operates as a deglitch circuit.

4. The receiver of claim 1, wherein the modulator circuit comprises an integrator including an integrator input coupled to the demodulator output and including an integrator output coupled to the second input of the multiplexer.

5. The receiver of claim 1, wherein the synchronous demodulator comprises:
   a comparator including a comparator input coupled to the multiplexer output, a reference input for receiving a reference signal, and a comparator output coupled to the output of the synchronous demodulator; and
   a bit clock recovery circuit including a recover circuit input coupled to the comparator output and a recover circuit output coupled to the reference input, the bit recovery circuit configured to lock phase decisions to bits of the selected one of the first and second signals to produce the demodulated output.

6. The receiver of claim 1, wherein the asynchronous demodulator comprises:
   a phase-to-frequency converter including a converter input configured to receive a phase modulated signal and a converter output configured to provide a frequency signal;
   a data filter including a filter input configured to receive an amplitude modulated signal and including a filter output configured to provide a filtered signal;
   a first multiplexer including a first input coupled to the converter output, a second input coupled to the filter output, a control input coupled to the controller, and a first multiplexer output;
   a plurality of detectors, each detector of the plurality of detectors including an input coupled to the first multiplexer output and including an output; and
   a second multiplexer including a plurality of inputs, each of the plurality of inputs coupled to the output of one of the plurality of detectors, the second multiplexer further including a control input coupled to the controller and a second multiplexer output configured to provide the demodulated signal to the modulator output.

7. The receiver of claim 6, wherein the plurality of detectors comprises at least one of a moving average detector, a peak detector, a kind detector, and a mean detector.

8. A method comprising:
   receiving a phase modulated signal at a first terminal and an amplitude modulated signal at a second terminal of a receiver circuit;
   demodulating the phase modulated signal using an asynchronous demodulator to produce a demodulated signal;
   re-modulating the demodulated signal to produce a second signal;
   providing a selected one of the phase modulated signal and the second signal to an output of a multiplexer; and
   demodulating the selected one of the phase modulated signal and the second signal using a synchronous demodulator coupled to the output of the multiplexer.

9. The method of claim 8, wherein providing the selected one of the phase modulated signal and the second signal to the output comprises:
   receiving the phase modulated signal at a first input of a multiplexer;
   receiving the second signal at a second input of the multiplexer;
   receiving a control signal at a control input of the multiplexer; and
   providing the selected one in response to receiving the control signal.

10. The method of claim 8, wherein demodulating the selected one of the phase modulated signal and the second signal comprises:
    comparing the selected one to a reference signal using a comparator to produce an output signal representing a difference; and
    controlling the comparator to lock phase decisions to bits of the selected one to produce a demodulated output.

11. The method of claim 8, wherein demodulating the phase modulated signal comprises:
    converting the phase modulated signal into a frequency signal using a phase-to-frequency converter;
    filtering the amplitude modulated signal to produce a filtered signal using a data filter;

providing a selected one of the frequency signal and the filtered signal to a multiplexer output;

detecting a parameter of the selected one using a plurality of detectors having a respective plurality of detector outputs to provide a respective plurality of detector output signals;

selectively providing a selected detector output signal of the respective plurality of detector output signals to an input of the multiplexer.

12. The method of claim 11, wherein the plurality of detectors includes at least one of a moving average detector, a peak detector, a kind detector, and a mean detector.

13. The method of claim 8, wherein re-modulating the demodulated signal to produce the second signal comprises integrating the demodulated signal using an integrator.

14. The method of claim 8, wherein providing the selected one of the phase modulated signal and the second signal to the output comprises:

determining whether the receiver is in a synchronous receive mode or an asynchronous receive mode;

providing the phase modulated signal to the output when the receiver is in the synchronous receive mode; and providing the second signal to the output when the receiver is in the asynchronous receive mode.

15. A receiver circuit comprising:

an asynchronous demodulator including a demodulator input configured to receive an input signal and including a demodulator output configured to provide a demodulated signal;

a modulator including a modulator input coupled to the demodulator output and a modulator output configured to provide a second signal;

a multiplexer including a first input configured to receive the input signal, a second input coupled to the modulator output, a control input, and a multiplexer output; and a synchronous demodulator including an input coupled to the multiplexer output and an output configured to provide an output signal.

16. The receiver circuit of claim 15, further comprising a controller coupled to the control input of the multiplexer and configured to control the multiplexer to selectively provide one of the input signal and the second signal to the synchronous demodulator.

17. The receiver circuit of claim 16, wherein the controller controls the multiplexer to provide the second signal to the synchronous demodulator to deglitch the second signal.

18. The receiver circuit of claim 16, wherein the modulator comprises an integrator configured to re-modulate the demodulated asynchronous output signal to provide a phase modulated signal suitable for the synchronous demodulator.

19. The receiver circuit of claim 15, wherein the asynchronous demodulator comprises:

a phase-to-frequency converter including a converter input configured to receive a phase modulated signal and a converter output configured to provide a frequency signal;

a data filter including a filter input configured to receive an amplitude modulated signal and including a filter output configured to provide a filtered signal;

a first multiplexer including a first input coupled to the converter output, a second input coupled to the filter output, a control input coupled to the controller, and a first multiplexer output;

a plurality of detectors, each detector of the plurality of detectors including an input coupled to the first multiplexer output, and including an output;

a second multiplexer including a plurality of inputs, each of the plurality of inputs coupled to the output of one of the plurality of detectors, the second multiplexer further including a control input coupled to the controller and a second multiplexer output configured to provide the demodulated signal; and wherein the controller selectively controls the first and second multiplexers to provide the demodulated signal to the second multiplexer output.

20. The receiver circuit of claim 19, wherein the plurality of detectors comprises at least one of a moving average detector, a peak detector, a kind detector, and a mean detector.

\* \* \* \* \*